Figure 1:
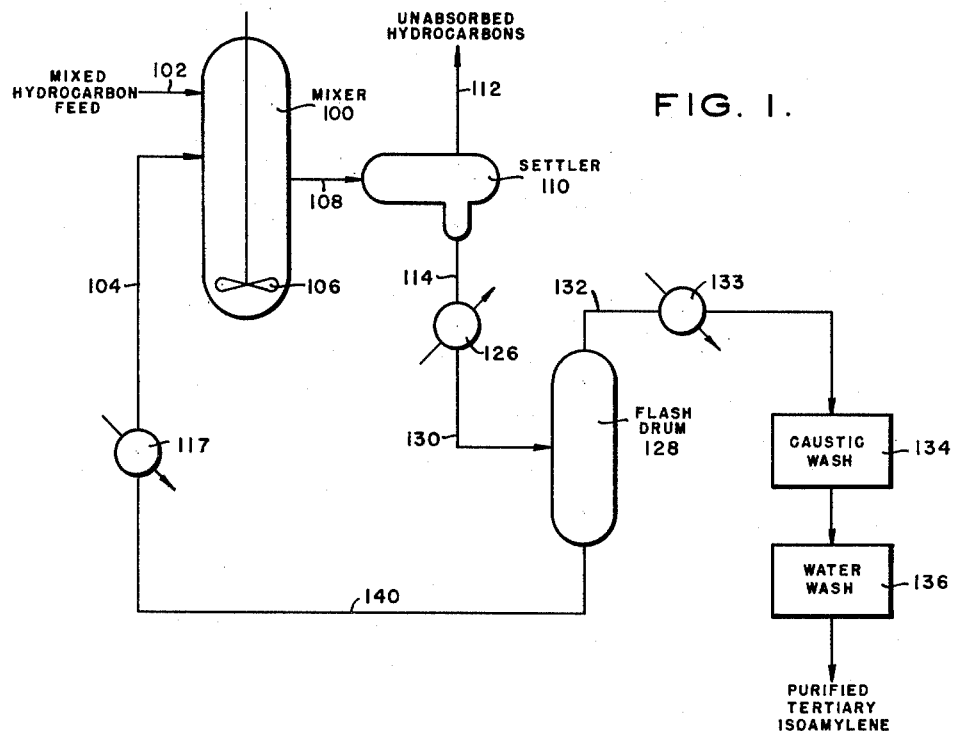

Sept. 22, 1964 W. R. EDWARDS ETAL 3,150,201

EXTRACTION PROCESS

Filed June 7, 1961

INVENTORS
WILLIAM R. EDWARDS,
ROBERT D. WESSELHOFT,
BY

ATTORNEY.

United States Patent Office 3,150,201
Patented Sept. 22, 1964

3,150,201
EXTRACTION PROCESS
William R. Edwards and Robert D. Wesselhoft, Baytown, Tex., assignors, by mesne assignments, to Esso Research and Engineering Company, Elizabeth, N.J., a corporation of Delaware
Filed June 7, 1961, Ser. No. 115,400
10 Claims. (Cl. 260—677)

The present invention relates to the production of tertiary olefins of 5 carbon atoms. More particularly, it deals with the selective extraction of tertiary isoamylene from an admixture with its isomers by contacting the hydrocarbon mixture with sulfuric acid, followed by the separation from the resultant acid phase of the chemically absorbed tertiary olefins, to recover said olefin as a substantially purified product.

The present invention has several aspects. The acid to be used in the extraction step is the source of excessive corrosion if chosen for use at a lower acid strength than about 62% $H_2O_4$. For example, if the acid is used at a 60% strength, carbon steel processing equipment is unsuitable unless provided with expensive lead sheathing and/or lining. The present invention avoids this corrosivity by utilizing an acid concentration from about 62% to about 70%, preferably at a strength of about 65%. This allows the use of conventional carbon steel equipment which is markedly less expensive than lead-lined facilities. In the prior art, the use of acid of 65% strength in the recovery of isoamylenes has been considered unworkable, in that excessive polymerization during the re-extraction step was encountered unless the acid was diluted before regeneration. Acid dilution is unsuitable in that it requires a reconstitution of the sulfuric acid before reuse in the initial extraction step. By the practice of the present invention, however, polymerization is avoided by utilizing thermal regeneration by indirect heating at a rate which is higher than a critical minimum.

Another aspect of the present invention deals with the discovery that substantially 100% regeneration of the fat acid may be accomplished by heating the fat acid to a temperature at which virtually no olefin remains chemically combined with the acid. This temperature is substantially higher than the temperatures heretofore approached in thermal regeneration. When higher acid strength and higher temperature are combined during acid regeneration, excessive polymerization would be expected, because polymerization is a direct function both of temperature and of acid strength. Surprisingly, however, it has been found by the practice of the present invention that polymerization can be minimized by utilizing a heating rate that is faster than a critical minimum, as is more fully set forth hereinafter.

In another aspect of the present invention, it has been found that for a given acid strength and for a given regeneration temperature, the formation of polymers of the tertiary isoamylene may be minimized by utilizing higher acid fastnesses; that is, by increasing the amount of tertiary isoamylene present in the acid solvent. These aspects will be more fully understood by a reference to the more specific discussion and examples which are provided hereinafter.

The present invention finds particular utility in the recovery of the tertiary $C_5$ olefins; for example, in recovering 2-methylbutene-1 and 2-methylbutene-2 from other close-boiling $C_5$ hydrocarbons such as pentene-1, pentane, isopentane, etc. The initial separation of the tertiary olefins is accomplished by contacting a hydrocarbon mixture with sulfuric acid of about 65% strength in an extraction zone, wherein the extraction is accomplished at hydrocarbon-to-acid ratios of about 3:1 to about 1:3, at a temperature of about 0° F. to about 40° F., and at a pressure of about 0 to about 50 p.s.i.g. The preferred conditions for the extraction step are a temperature of about 50° F., a hydrocarbon-to-acid ratio of about 2:1, and atmospheric pressure. The time of contact is not particularly critical, so long as an inordinately long period is avoided, during which polymerization might occur.

Figure 2:
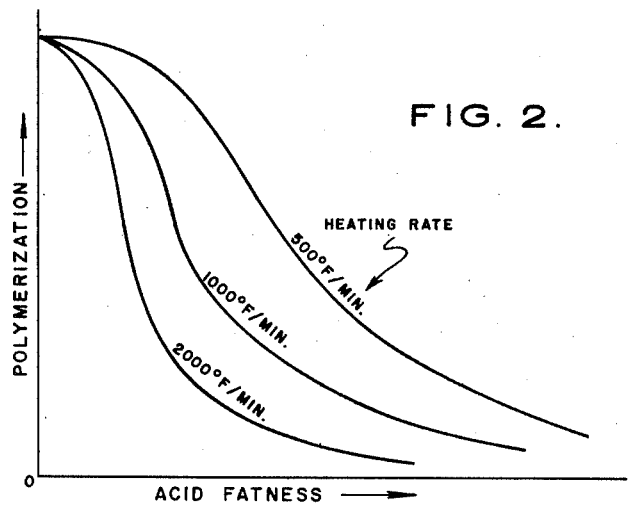

A better understanding of the process may be obtained by a reference to FIG. 1 wherein a schematic diagram of the practice of a preferred mode of the present invention is set forth, and to FIG. 2 which schematically represents the relationships of temperature, acid fatness, and polymerization.

Referring now to FIG. 1, the mixed hydrocarbon charge comprising isomeric $C_5$ hydrocarbons, including tertiary olefins, is introduced into a mixer 100 by line 102, and admixed with sulfuric acid of 62 to 70 weight percent concentration, which is introduced into the contacting vessel by way of line 104. The acid and hydrocarbon are mixed at a temperature of about 0° F. to about 60° F. and at atmospheric pressure by means of the mixing means 106, driven by a prime mover (not shown). The mixing may be accomplished by an energy input of about 0.4 H.P. per barrel to about 4.0 H.P. per barrel. This contacting step is continued until an acid fatness preferably of at least 15% is attained. The admixed acid and hydrocarbon are then passed by line 108 to a settler 110 wherein a raffinate phase and an extract or fat acid phase are formed. The raffinate phase is removed by means of line 112, and may be recycled in whole or in part to the charge line 102 by a transfer line (not shown). The acid extract or fat acid phase, containing the tertiary olefin in chemical combination within the acid environment, is passed at the extraction temperature by line 114 into a heater 126, wherein the temperature is rapidly raised to a temperature at least as high as the temperature at which the olefin may not exist in chemical combination with the acid in other than insignificant amounts. The heat may be supplied, for example, by a steam jacket, by steam coils, by a hot process stream, or other source of indirect heat. The rate of heating in the heater 126 is critical, and must be above a minimum of about 200° F. per minute for about 65% sulfuric acid in order that objectionable amounts of polymerization may be avoided. As the fat acid is heated to the final temperature, a hydrocarbon phase is formed almost instantaneously which comprises released tertiary olefins of high purity, and the remaining acid phase is substantially free of combined olefin. No prolonged period of separation is required since virtually all of the isoamylene is instantaneously released upon reaching the minimum temperature. This two-phase system is introduced as quickly as possible into a separator, for example into a flash drum 128, by means of line 130 in order to accomplish a separation of the olefin from the acid. This transfer can normally be accomplished in less than about 0.1 second, and this is preferred as a means for minimizing polymerization. The olefin is preferably allowed to vaporize at least partially during its passage through the heater 126, in order to minimize polymer formation, so the olefin phase may be wholly or partly vaporous when charged to the flash drum. From the flash drum 128, the olefin is withdrawn as a vapor through line 132, for subsequent condensation in condenser 133 and aftertreatment. The aftertreatment may be accomplished, for example, by means of a caustic wash 134 and a water wash 136, to produce a marketable purified tertiary olefin product. The acid from the flash drum 128 is withdrawn by line 140 and recycled without reconstitution into the contactor 100 by means of a cooler 117 and line 104. The cooler 117 is provided in order to lower the acid temperature to that desired in the initial contacting operation. By utilizing the process as set forth above, isoamylene may be recovered from the fat acid in substantially quantitative amounts; that is, the acid recycled by way of line 140 will contain virtually no olefin in chemically combined form. By controlling the heating rate in heater 126, the polymer formation may likewise be minimized. Since the practice of the present invention allows the use of sulfuric acid of a strength above 62%, the corrosivity problem does not exist, and carbon steel processing equipment and transfer lines may be used. In order to better understand the significance of the present invention, attention is directed to the following examples.

EXAMPLE I

One volume of a $C_5$ hydrocarbon blend containing tertiary olefin hydrocarbons was contacted with one volume of 65% sulfuric acid at about 20° C. at atmospheric pressure, for a period of about 30 minutes. The mixture was agitated by a mechanical stirrer. The resultant two-phase product was separated by withdrawing the supernatant liquid as an unabsorbed hydrocarbon phase. The acid phase, or fat acid, contained about 8% dissolved olefin. The fat acid was then heated at a rate of about 20° C. (36° F.) per minute to a final temperature of 158° F. A pressure of 100 mm. of mercury absolute was maintained during the acid regeneration, and a product was obtained which comprised 58.1% olefin, 1.8% alcohol, and 40.1% polymer. Only about 93.4% release of dissolved olefins was obtained from the fat acid. By maintaining the system under a vacuum and continuing the stirring for 45 minutes after the desired temperature of 158° F. was attained, the remaining olefin was removed.

EXAMPLE II

A portion of the fat acid utilized in Example I was passed through an indirect heat exchanger at atmospheric pressure, and allowed to vaporize during the passage therethrough. The final temperature was 187° F., and a heating rate of 675° F. per minute was utilized. 100% release of the isoamylene was accomplished at a polymer formation of only 18.2%.

EXAMPLE III

A portion of the fat acid of Example I was regenerated in a manner similar to Example II, with the exception that the final temperature was only 160° F. and a heating rate of 476° F. per minute was utilized. Under these conditions, 94% isoamylene release was accomplished at a polymer formation of only 12.6%. It should be noted that substantially the same regeneration as in Example I was attained while suffering only about one-fourth the polymer loss.

EXAMPLE IV

A run similar to Example II was made using a 65% sulfuric acid extract of 25% acid fatness as the charge stock to the regenerator. The fat acid was heated at a rate of 687° F. per minute to a final temperature of 189° F. 100% isoamylene release was accomplished at a polymer formation of only 4.2%.

EXAMPLE V

A 65% sulfuric acid extract of tertiary isoamylene having 15% acid fatness was regenerated in a manner similar to Example II with the exception that the regeneration was accomplished at 50 p.s.i.g. pressure so that liquid phase conditions existed throughout the run. A final temperature of 180° F. was obtained by heating at a rate of 2474° F. per minute. Only 88% isoamylene release was accomplished, and the polymer formation amounted to 10.8%.

EXAMPLE VI

A 65% acid etxract of isoamylenes containing 15% tertiary isoamylene dissolved in the acid was regenerated by passage through an indirect heat exchanger and heated at 3892° F. per minute to a final temperature of 250° F. The olefin was allowed to vaporize in the exchanger. 100% isoamylene release was accomplished, and only 7.4% polymer was formed. This compares favorably with the liquid phase regeneration of Example V wherein 10.8% polymer was formed and only 88% isoamylene release was accomplished.

EXAMPLE VII

A 65% sulfuric acid extract of isoamylene containing 8% dissolved olefins was regenerated by passage through the indirect heat exchanger and heated to a temperautre of 188° F. at a rate of 675° F. per minute. Under these conditions, 100% isoamylene release was accomplished but 29.9% of the olefin was polymerized. This regeneration was accomplished under 50 p.s.i.g., so that liquid phase regeneration was accomplished. This example should be compared to the substantially identical run in Example II wherein the olefin was allowed to vaporize within the exchanger and only 20.7% of the olefin was polymerized.

EXAMPLE VIII

A 65% sulfuric acid extract of tertiary isoamylene containing 25% olefin was regenerated in the liquid phase by passage through an indirect heat exchanger under 50 p.s.i.g. pressure, and heated to a final temperature of 196° F. at a heating rate of 545° F. per minute. Under these conditions, 100% isoamylene release was accomplished at a polymer formation of only 10.2%.

The results of the foregoing examples are summarized below in Table I.

*Table I*

| Example | Acid fatness, percent | Temp., °F. | Heating rate, °F./min. | Polymerization wt. percent of dissolved olefin | Isoamylene release, percent |
|---|---|---|---|---|---|
| I | 8 | 158 | 36 | 43.6 | 93.4 |
| II | 8 | 187 | 675 | 20.7 | 100 |
| III | 25 | 189 | 687 | 4.2 | 100 |
| IV | 8 | 160 | 476 | 12.6 | 94 |
| V | 15 | 180 | 2,474 | [1] 10.8 | 88 |
| VI | 15 | 250 | 3,892 | 7.4 | 100 |
| VII | 8 | 188 | 675 | [1] 29.9 | 100 |
| VIII | 25 | 196 | 545 | [1] 10.2 | 100 |

[1] Liquid phase regeneration.

As is seen by a comparison of the results of the various runs above set forth, the percentage regeneration which may be accomplished is seen to depend upon the final temperature attained during passage through the heater; that is, a minimum temperature must be attained before 100% regeneration can be accomplished. As is also apparent from a comparison of the above data, an increase in the acid fatness is accompanied by a decrease in the percentage of the dissolved olefin which is lost due to polymerization. A further fact which is evident from a comparison of the above data is that the amount of polymerization which occurs during liquid phase regeneration is higher than the polymerization losses which are sustained when the olefin is allowed to vaporize within the indirect heater.

The minimum temperature to which the fat acid extract of isoamylene must be heated if 100% regeneration is to be accomplished depends on acid strength. For tertiary isoamylenes in 65% sulfuric acid, for example, a temperature of about 180° F. must be attained for 100% regeneration. For higher acid strengths, higher temperatures are required. For example, at 70% acid strength, 240° F. is required for complete regeneration.

It has been found further that polymerization losses decrease with increasing acid fatness. This relationship is shown schematically in FIG. 2. It is, therefore, seen that for increasing acid concentration, the final temperature which is required for 100% regeneration becomes higher, and at higher acid fatnesses, the amount of polymerization decreases.

By utilizing an acid fatness in excess of 15% or more, and a temperature high enough for 100% regeneration, the present invention provides a means for carrying out the extraction and regeneration process whereby tertiary isoamylenes may be recovered economically while utilizing 65% sulfuric acid. At acid fatnesses below about 15%, even in the case where the olefin is allowed to vaporize within the exchanger, and high heating rates are utilized, excessive polymerization losses may be encountered. For example, reference to Example IV will disclose that at 160° F. only 94% regeneration was accomplished while 12.6% of the olefin was polymerized where a heating rate of 476° F. per minute was used. Reference to Example II will show that when heated to 187° F. to accomplish 100% regeneration, with a heating rate of 675° F. per minute being utilized, 20.7% of the olefin was lost by polymerization. When the acid fatness was increased to 15%, even though the temperature was experimentally raised to 250° F. in Example VII, only 7.4% polymer was made. In Example III, where a 25% acid fatness was utilized under conditions essentially the same as those of Example II, the formation of only 4.2% was suffered, which amounted to only one-fifth of the polymer which was formed with 8% acid fatness. It has been found that a minimum fatness of 15% should be maintained if polymerization is to be controlled.

As has been shown above, the use of 65% sulfuric acid as the extraction liquid for the recovery of tertiary isoamylenes may be carried out economically and commercially if the heating rate is maintained above about 200° F. per minute. Complete regeneration is accomplished at higher temperatures than heretofore considered feasible. Polymer formation is minimized by utilizing higher rates of heating, by forming acid extracts of at least 15% acid fatness, and by allowing the olefin to vaporize in the heat exchanger.

The inventors having disclosed in detail the terms of the present invention, and having set forth a preferred and best mode of practicing the invention, what is desired to be covered by Letters Patent should be limited not by the specific examples as set forth hereinabove, but only by the terms of the appended claims.

We claim:
1. In the thermal regeneration of tertiary isoamylene from a 62 weight percent to 70 weight percent sulfuric acid, the improvement which comprises heating the acid to a final temperature of at least 180° F. at which the isoamylene is substantially completely regenerated, and at a heating rate of at least 200° F. per minute, whereby polymerization losses are minimized.
2. A method in accordance with claim 1 wherein the acid fatness is at least 15%.
3. A method in accordance with claim 1 wherein the acid strength is about 65%, the acid fatness is 15%, and the heating rate is about 675° F. per minute.
4. A method in accordance with claim 1 wherein the acid strength is about 65% and the acid fatness is about 25%.
5. A method in accordance with claim 1 wherein the isoamylene is allowed to vaporize during the heating step.
6. A method of recovering tertiary isoamylene from a hydrocarbon admixture which comprises contacting said admixture in an extraction zone with sulfuric acid having a concentration of from about 62% to about 70% by weight under conditions to obtain an acid extract, whereby a raffinate phase and an acid extract phase are formed, separating said acid extract phase from said raffinate phase, heating said acid extract at a rate of at least 200° F. per minute to a final temperature of at least 180° F. at which substantially all of the tertiary isoamylene is released from said acid, separating the released olefin from the acid, and recovering said isoamylene.
7. A method in accordance with claim 6 wherein the acid fatness is at least 15%.
8. A method in accordance with claim 6 wherein the acid concentration is about 65% by weight and where the acid fatness is about 15%.
9. A method in accordance with claim 6 wherein the acid concentration is about 65% by weight and where the acid fatness is about 25%.
10. A method in accordance with claim 6 wherein the isoamylene is allowed to vaporize during the heating step.

References Cited in the file of this patent
UNITED STATES PATENTS
2,968,682    Crouse et al. _____ Jan. 17, 1961